(12) United States Patent
Kassam et al.

(10) Patent No.: US 10,149,504 B2
(45) Date of Patent: Dec. 11, 2018

(54) COATED FABRIC AND PROCESS FOR FORMING A POLYMERIC COATING ON A LINER

(75) Inventors: Mikhail Kassam, Toronto (CA); Raja Rizwan Ahmed, Karachi (PK); Syed Umair Ahmed, Karachi (PK)

(73) Assignee: Midas Safety Innovations Limited, St. Helier (JE)

( * ) Notice: Subject to any disclaimer, the term of this patent is extended or adjusted under 35 U.S.C. 154(b) by 1124 days.

(21) Appl. No.: 13/261,796

(22) PCT Filed: Jul. 2, 2012

(86) PCT No.: PCT/GB2012/051548
§ 371 (c)(1),
(2), (4) Date: Jan. 9, 2014

(87) PCT Pub. No.: WO2013/007983
PCT Pub. Date: Jan. 17, 2013

(65) Prior Publication Data
US 2014/0115750 A1    May 1, 2014

(30) Foreign Application Priority Data

Jul. 11, 2011  (GB) .................................. 1111830.4

(51) Int. Cl.
| | | |
|---|---|---|
| *A41D 19/00* | (2006.01) | |
| *B29C 41/14* | (2006.01) | |
| *B29C 41/20* | (2006.01) | |
| *A41D 19/015* | (2006.01) | |

(52) U.S. Cl.
CPC ............ *A41D 19/001* (2013.01); *B29C 41/14* (2013.01); *B29C 41/20* (2013.01); *A41D 19/01558* (2013.01); *Y10T 428/24355* (2015.01)

(58) Field of Classification Search
USPC ............................ 2/159; 428/141; 427/385.5
See application file for complete search history.

(56) References Cited

U.S. PATENT DOCUMENTS

| | | |
|---|---|---|
| 4,497,072 A | 2/1985 | Watanabe |
| 7,378,043 B2 | 5/2008 | Hassan et al. |
| 7,771,644 B2 | 8/2010 | Flather et al. |
| 7,814,570 B2 | 10/2010 | Hassan et al. |
| 7,814,571 B2 | 10/2010 | Thompson et al. |
| 7,971,275 B2 | 7/2011 | Saunders et al. |
| 8,137,606 B2 | 3/2012 | Thompson et al. |
| 8,387,167 B2 | 3/2013 | Matsunobu et al. |
| 8,522,363 B2 | 9/2013 | Hassan et al. |
| 2006/0068138 A1 | 3/2006 | Janssen et al. |
| 2007/0118967 A1 | 5/2007 | Flather et al. |
| 2007/0192929 A1 | 8/2007 | Flather et al. |
| 2009/0081343 A1* | 3/2009 | Vuorela ............ A22C 13/0013 426/413 |
| 2011/0265246 A1 | 11/2011 | Saito |

FOREIGN PATENT DOCUMENTS

| | | |
|---|---|---|
| EP | 2143551 A1 | 1/2010 |
| GB | 653569 A | 5/1951 |
| JP | 2002-020913 A | 1/2002 |

* cited by examiner

*Primary Examiner* — Lynda Salvatore
(74) *Attorney, Agent, or Firm* — Marshall & Melhorn, LLC

(57) ABSTRACT

Fabrics are disclosed having a liner with a polymeric coating, the coating comprising 0.25 to 8 ridges per cm and pits at an area density of 20 to 2500 cm². The fabrics provide good friction in oily conditions. Also disclosed are methods for producing such fabrics comprising applying to a liner a liquid comprising water and a precursor of a polymeric material, contacting the liquid on the liner with a water-sorbing material and curing the polymeric coating. The fabrics may find use in gloves.

17 Claims, 4 Drawing Sheets

COATED FABRIC AND PROCESS FOR FORMING A POLYMERIC COATING ON A LINER

BACKGROUND OF THE INVENTION

The present invention relates to fabrics, more particularly fabrics comprising a liner having a polymeric coating on at least a portion thereof and garments especially gloves, made from such fabrics. The invention also relates to methods for forming a polymeric coating on a liner.

Gloves with enhanced gripping characteristics are desirable in many fields of industry. In particular, synthetic or natural latex rubber gloves have been manufactured by various routes. For example U.S. Pat. No. 7,814,570 discloses synthetic or natural latex gloves without liners which have a roughened surface obtained by using a tacky, polymeric coagulant with the coagulant particles forming impressions on the latex glove surface.

Similar techniques are disclosed in US-A-2007/0192929 relating, again, to latexes of natural or synthetic rubber.

U.S. Pat. No. 4,497,072 relates to coated gloves with a rubber or resin (such as vinyl resin) coating which ensures adequate ventilation. This is achieved in this patent by coating a liner of the glove with a foaming resin solution and subsequently applying low pressure to the coating in order to burst the small bubbles on the surface.

One further method of improving the grip of polymeric coatings on gloves is applicable when the polymeric coating is formed from natural rubber. In these gloves, a natural rubber wet gelled coating is subjected to treatment with an organic solvent such as paraffin. The result of this treatment is a crinkle surface on the rubber coating which enhances grip. Natural rubber has poor solvent resistance and consequently solvent is readily absorbed. Other, synthetic polymers have greater solvent resistance (for example nitrile rubber, carboxylated acrylonitrile butadiene). Nitrile rubber is rarely subjected to crinkle treatment since it absorbs organic solvents poorly and so the crinkle finish is difficult to achieve and the crinkles are poorly defined (even with such aggressive solvents as xylene or toluene). Other polymers such as neoprene (polychloroprene) are also solvent resistant. Crinkle surface gloves typically have many crinkles per linear cm across the surface.

Although many gloves are known to have reasonably good grip in dry conditions (and occasionally also in the presence of water) such gloves generally have poor or very poor grip in oily conditions. Oily conditions are commonly met with in an industrial environment and, for reasons of safety, convenience and comfort, it is important that a good oil grip is provided. It is also important in other uses of coated fabrics to increase the friction of the coated fabric in oily conditions.

SUMMARY OF THE INVENTION

It is an aim of the present invention to provide fabrics having polymeric coatings with significantly enhanced grip, feel for the user and also appearance compared to known fabrics especially in oily conditions. It is a further aim of the present invention to provide gloves comprising such fabrics with significantly enhanced grip, especially in oily conditions and preferably to provide such properties using a variety of polymeric materials.

The present invention accordingly provides a fabric comprising a liner having a polymeric coating on at least a portion thereof, wherein the polymeric coating comprises 0.25 to 8 ridges per cm.

Preferably, the ridges have heights of less than 8 mm, more preferably less than 6 mm and most preferably less than 5 mm.

Such a fabric is greatly beneficial because it improves the performance of the polymer coating and improves tactility and dexterity of the fabric (especially when used in gloves). Furthermore, fabric according to the invention provides a soft feel. The ridges and pits in combination improve the coefficient of friction especially in oily conditions and consequently are highly beneficial.

Generally, the polymeric coating may comprise any material which can be used in a liquid coating type process (i.e. a polymer latex) which is based upon or containing water. Examples of suitable polymer materials include acrylonitrile, polychloroprene, natural rubber latex, isoprene, butyl rubber, polyurethane or nitrile rubber (carboxylated acrylonitrile butadiene).

Preferably the polymeric coating comprises an elastomeric material and, in particular, a rubber. Examples of rubbers include polychloroprene, natural rubber, isoprene, butyl rubber, and nitrile rubber.

Usually, the coating will comprise 50 to 2000 pits $cm^{-2}$, preferably 100 to 2000 pits $cm^{-2}$.

It is preferred if the coating comprises 150 to 1500 pits $cm^{-2}$, more preferably 150 to 1000 pits $cm^{-2}$, even more preferably 200 to 750 pits $cm^{-2}$ and most preferably 200 to 600 pits $cm^{-2}$.

Generally, it is preferred if the polymeric coating comprises 0.25 to 6, or 0.25 to 5 ridges/cm, more preferably 0.5 to 5 per cm, or 1 to 5 per cm and most preferably 2 to 5 ridges per cm. A linear density or frequency of ridges in these ranges has proved advantageous in terms of the feel and grip (especially when used in gloves) of the fabric.

Preferably, the orientation of the ridges across the surface of the material is substantially random and/or (on a large enough sample) is essentially isotropic.

The ridges preferably are of varying height (which again improves the grip, coefficient of friction and feel of the fabric). Generally, at least a portion of the ridges would be less than 4 mm in height or less. Generally, the ridges will be of a range of heights down to extremely low heights of less than 1 mm and preferably less than 0.1 mm.

In a preferred embodiment of the present invention, there is provided a glove comprising fabric according to the first aspect of the invention. This is particularly advantageous because many of the properties of the fabric according to the first aspect of the invention are particularly applicable to use in gloves especially as regards the soft feel, grip and dexterity of the fabric. The glove liner may be generally of any suitable material. Suitable liner materials include aramid (either meta or para aramid), polyamides (e.g. nylon), polyester, cellulosics (e.g. linen, cotton), PBP P-phenylene 2,6, benzobizoxazole, polyester, acrylic, polyolefin, polyvinyl alcohols, metal fibres, glass fibres, silk, wool, acetate, PTFE, carbon fibre, Rayon™, bamboo fibre, polybenzimidazole, Lycra™ or a mixture of one or more of these materials. The liner may be produced in any generally known way including by cut and sewing, knitting (warp or in particular weft knitting), weaving or by a non-woven technique.

Surprisingly, the applicants of the present invention have discovered that the fabric and gloves according to the present invention may be made by a process which does not require the use of organic solvents (which has important environmental advantages).

Thus, the present invention accordingly provides in a second aspect a process for forming a polymeric coating on a liner, the process comprising: providing a liner, applying to at least a portion of the liner a liquid comprising water and a precursor of a polymeric material, contacting the liquid on the liner with a water-sorbing material, and curing the polymeric coating. Preferably, the polymeric material is dispersed in the water component of the liquid.

The water-sorbing material affects the surface during the process to provide the, surprising and unique, structure of ridges and pits in the surface as discussed in relation to the first aspect.

Without wishing to be bound it currently appears that applying the water-sorbing materials results in water on the surface being absorbed which has the effect of draining the area surrounding each particle of the water-sorbing material. This appears to cause the coating to shrink and deform into the wavelike pattern comprising ridges. As water is removed from the surface the polymeric material destabilises and gels in the wavelike pattern.

The surface of the polymeric coating may additionally be covered in tiny pits. It is thought that the pits are the result of the water-sorbing material pulling in the water rapidly and destabilising the latex locally which results in coagulation around the particles. Subsequent removal of the particles results in the pits formed in the surface.

Preferably, the water-sorbing material comprises a water absorbing material.

The method of applying the water-sorbing material (which is preferably in particle, or powder, form) may be selected from sprinkling the particles on the liquid, spraying the particles, shower coating with the particles or fluidised bed applications. The preferred fluidised bed application is a dip application process into a fluidised bed of particles of the material.

Preferably, the particle size of at least a portion of the water sorbing material is in the range 10 to 500 µm, preferably 50 to 450 µm and more preferably 75 to 425 µm. It is preferred if >80% of the particles of the water sorbing material are retained on a Mesh size 40 (equivalent to 400 µm) sieve.

The most preferred water-sorbing materials are modified celluloses for example hydroxy alkyl cellulose, carboxy alkyl cellulose and/or smectite clay (in particular bentonite or montmorillonite). The preferred modified celluloses are hydroxy ethyl cellulose or carboxy methyl cellulose. Other water-sorbing materials that may be used in the present invention include generally any material which absorbs a significant quantity of water. Consequently, cellulosic materials (e.g. cotton flock, or sawdust) may be used. Other materials which may be useful include one or more of vinyl acetate ethylene copolymer, sodium polyacrylate, polyacrylamide copolymer, polyvinyl alcohol copolymer, polyacrylate copolymer, ethylene maleic anhydride copolymer, cross-linked polyethylene oxide and/or a starch grafted copolymer of polyacrylonitrile. The polymeric water-sorbing materials (for example hydroxyl alkyl cellulose, or carboxy alkyl cellulose) may be cross-linked to reduce their solubility. It is preferred if the water-sorbing materials are poorly soluble or more preferably substantially insoluble in water.

Generally, as discussed in relation to the first aspect, the polymeric coating preferably comprises an elastomer, preferably a rubber.

As discussed above in relation to the first aspect, generally any water based latex is suitable for use in the second aspect of the invention the preferred materials are rubbers and, in particular, nitrile rubber.

The process is particularly useful in forming a coated glove in which the process for producing the coated glove comprises providing a glove liner and forming a polymeric coating on the glove lining using the process according to the second aspect of the invention.

BRIEF DESCRIPTION OF THE DRAWING

In order that the present invention may be better understood, it will now be described by way of example with reference to the accompanying drawings in which.

DETAILED DESCRIPTION OF THE INVENTION

Figure 1:
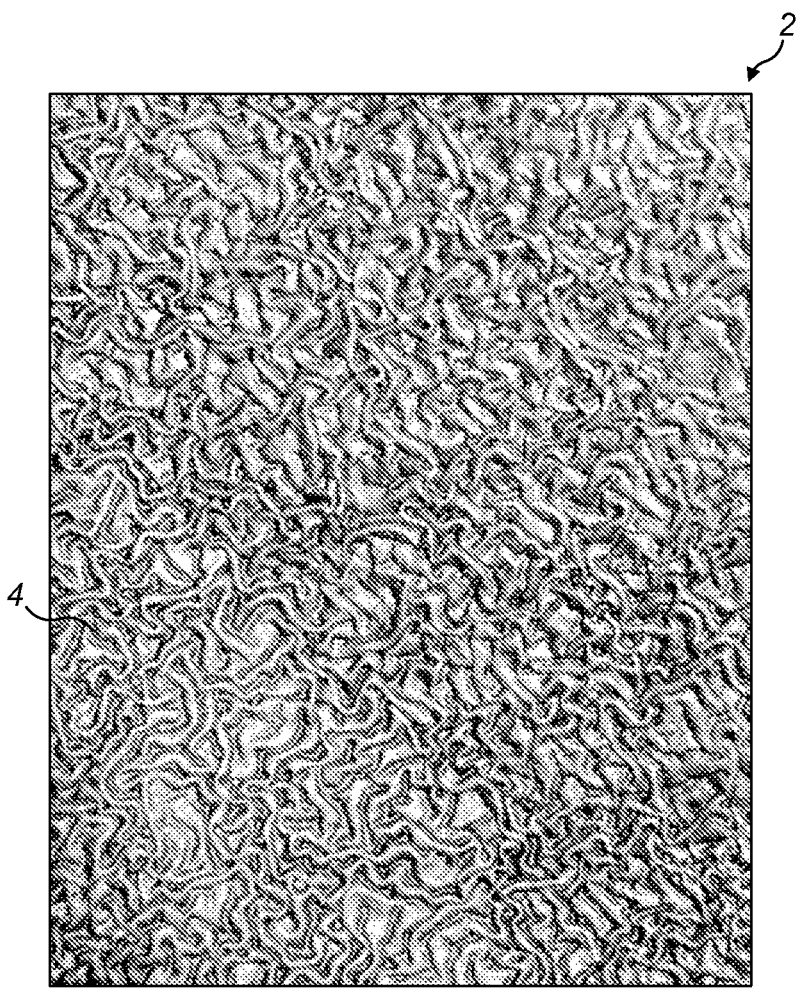
FIG. 1 is a detail of a photograph of prior art polymeric coated fabric produced according to the known crinkle process.

FIG. 1 illustrates a fabric 2 according to the prior art which comprises crinkles 4 on its surface. These crinkles are produced by depositing a polymeric coating of natural rubber on a liner and subsequently treating the natural rubber with organic solvent (for example paraffin) before curing. The crinkles of the surface have a linear frequency/density of a approximately 7 to 10 crinkles/cm.

Figure 2A:
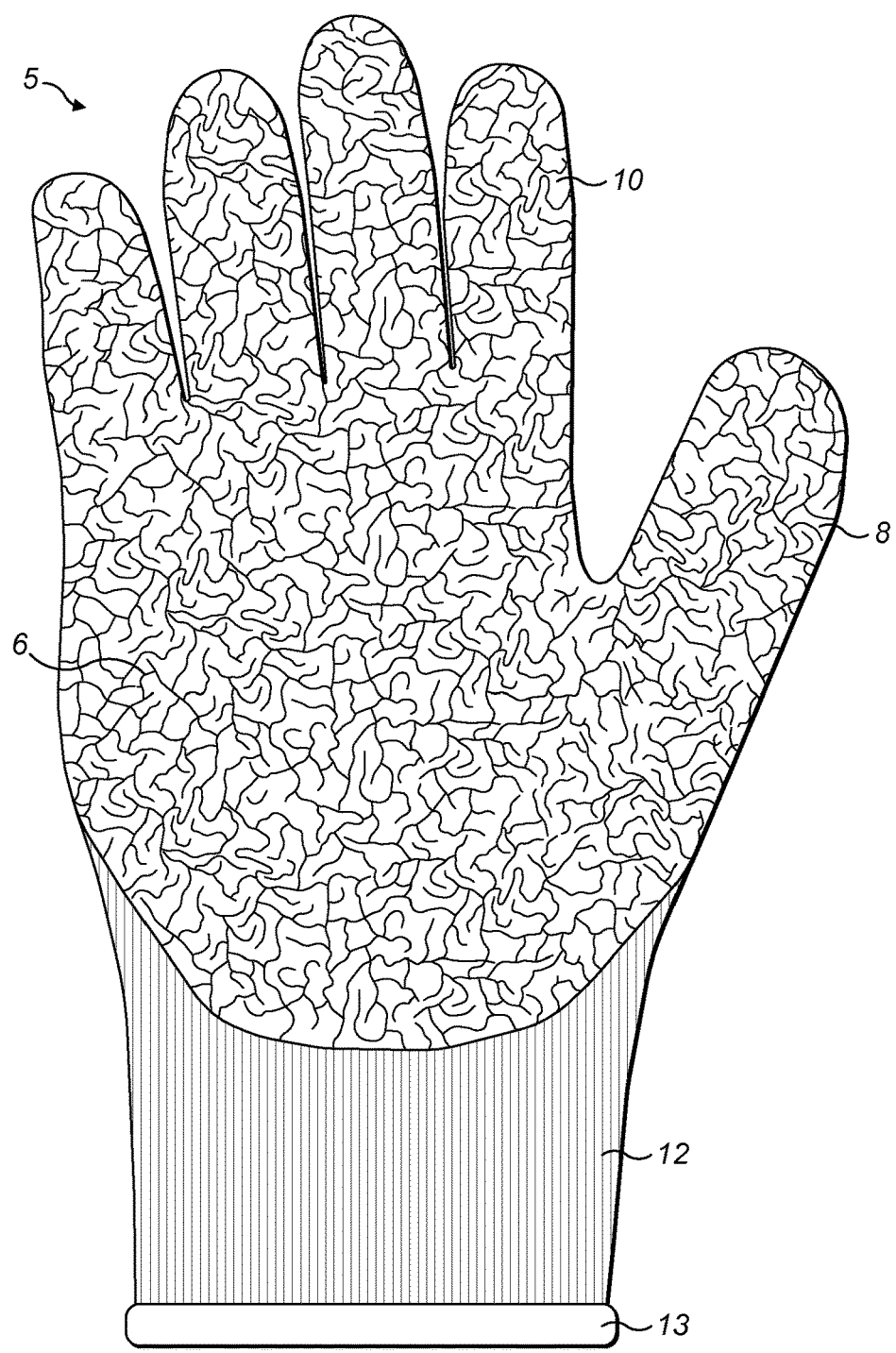
FIG. 2a is a drawing of a glove produced according to invention.

FIG. 2a illustrates a glove 5 according to the present invention comprising a fabric 6 consisting of a polymeric coating of nitrile rubber with a ridged surface and a liner 12 of knitted nylon (15 gauge). The polymeric coating extends over the whole of the palm of the glove 5 and also the palm side thumb 8 and fingers 10 of the glove with some coating on the backside (not shown) of the glove. The glove liner 12 has a finishing portion 13 at the end of the wrist portion to prevent unravelling.

Figure 2B:
FIG. 2b is a detailed photograph of the surface of a fabric according to the present invention.

FIG. 2b illustrates a detail 7 of the surface of the polymeric coating according to the present invention which comprises a number of randomly orientated ridges 16 raised above the surface of the fabric and also a number of pits 14 of very small size scattered across the surface of the polymeric coating on the fabric. The ridges typically have a frequency/linear density (measured using transects across the surface of the fabric) of approximately 1 to 3 per cm. The pits on the surface have an area density of approximately 240 to 400 $cm^{-2}$. The ridges 16 have varying heights of typically less than 4 mm.

The height of each ridge may be calculated as the distance between the trough and crest of the ridge.

Figure 3:
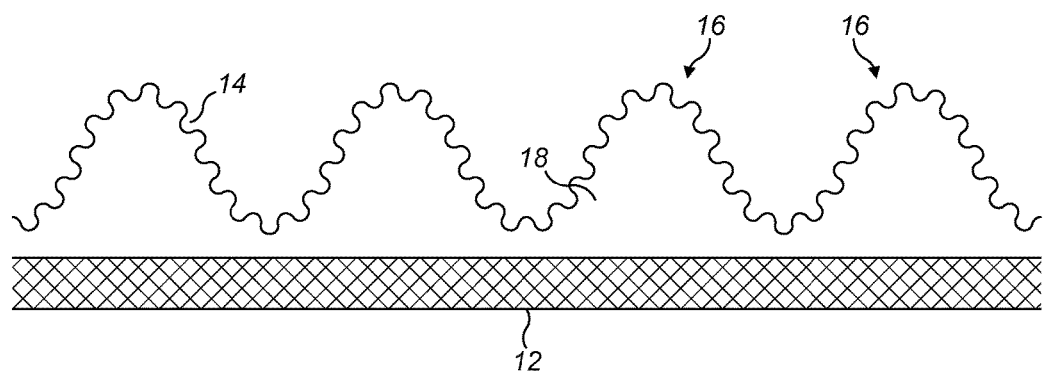
FIG. 3 is a magnified schematic diagram illustrating a cross-section through a fabric according to the present invention.
Figure 4:
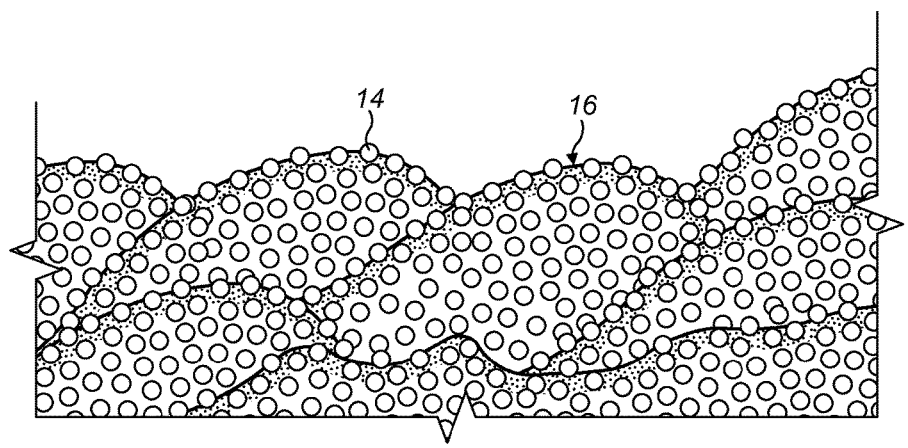
FIG. 4 is a schematic, perspective view of the surface (magnified) of a fabric according to the present invention.

FIG. 3 illustrates schematically a fabric according to the present invention comprising a polymeric coating 18 of e.g. nitrile rubber having a series of wave like ridges 16 across its surface. On both the ridges 16 and in between the ridges 16 the surface has microscopic pits 14. In combination the ridges 16 and pits 14 provide a very effective grip especially in oily conditions when, for example, the fabric is used in a glove. FIG. 4 illustrates a perspective view of the surface showing the wavelike ridges 16 and microscopic pits 14 as they are distributed (thought to be randomly) on the surface of the polymeric coating 18.

The invention is further illustrated by the following Example in which a glove as illustrated in FIG. 2a was manufactured according to the process of the present invention in order to provide a glove and fabric according to the first aspect of the invention.

The liner for the glove was a 15 gauge knitted nylon liner. The liner was dip processed to coat the palm side of the glove with a suitable elastomeric polymer coating. A carboxylated acrylonitrile butadiene polymer dipped coating would be a typical example of a preferred coating. Such a nitrile latex grade is 6322 commercially available from Synthomer Ltd, Kluang, Malaysia.

A suitable formulation for the elastomeric polymer coating for the dipping process is:
1. Synthomer 6322 latex—100.00 parts of rubber.
2. Anionic stabilizer—0.20 parts per 100 parts of rubber (phr).
3. Pigment—2.00 phr.
4. ZnO (zinc oxide)—4.00 phr.
5. PVA thickener—+/−to achieve the predetermined required viscosity of around 1000 centipoise.

The glove dipping process has the following steps:
1. Load the knitted shell on the dipping, hand-shape former.
2. Dip the former and liner into a pre-coagulant solution, preferably calcium nitrate in alcohol/water, where methanol is 94 parts, water is 5 parts and calcium nitrate is 1 part (coagulant solution is not necessary if the liner is cotton or cotton-based).
3. Withdraw the former and liner from the solution and allow it to semi-dry, fingers down draining for 60 seconds, followed by fingers up for 60 seconds.
4. Slowly dip the former and liner into the nitrile latex dipping compound at a rate of 0.5 to 1.0 cm per second.
5. Withdraw the former and liner from the nitrile compound slowly, preferably at a rate not faster than 1.0 cm per second, and at a steady rate sufficient to yield a coating having a uniform, predetermined thickness of about 0.25 mm to about 0.75 mm.
6. Allow excess latex to drain.
7. Sprinkle hydroxy ethyl cellulose powder on the wet surface.
8. Allow to react for 2-3 minutes.
9. Dry and cure the dipped glove for about 25 to 200 minutes at a temperature in the range of about 85° C. to about 125° C.
10. After curing leach in water for 5 mins at 50° C. on the former.
11. Strip off the finished glove and wash at 50° C. and repeat the process in water for 30 minutes, pre-dry with air and then dry at 110° C. for 20-25 minutes on a drying former.

The hydroxy ethyl cellulose powder has a particle size such that 100% is retained on sieve mesh size 40 (≡400 μm), 65% to 75% is retained on mesh 60 (≡250 μm), 40% to 50% retained on mesh size 70 (≡210 μm) and 20% to 25% on mesh size 140 (≡105 μm).

Gloves produced according to the Example were tested to determine the coefficient of friction in dry, wet (water) and oily conditions. Gloves with the same nitrile rubber coatings to which no further process was applied (i.e. smooth surface) and the crinkle process was applied were also tested for comparison.

All the equipment used was calibrated.

The apparatus used is designed to determine the coefficient of friction between two flat surfaces which are under a predetermined load. The measurements were taken at 500 mm/min at ambient temperature under dry, water wet and oil (10 W 40 commercial engine oil) contaminated.

Each test specimen was taken from the palm of the glove (the area of maximum grip) as this was the only place that generally a significant amount of material could be obtained. The palm material was clamped and draped over a 30 mm diameter rubber button which was approximately 9 mm high and had an approximate harness of 55 IRHD. By clamping the test specimen at one end, the material became taut naturally during the test.

The water wet and oil contaminated test specimens were conditioned in the respective fluids for a minimum of 30 minutes prior to testing.

The bearing surface was a ground steel plate having a surface roughness of less than 1 μm $R_a$. The same bearing surface was used for the dry, the water wet and finely the oil test.

With the test specimen mounted in the jig and adjusted so that it just touched the bearing surface, the load of 5 kg (49.1N) was applied to the test specimen/bearing surface assembly by means of a bearing mounted in a bell crank. The bearing surface was then drawn over the test specimen and the resulting force required measured. At the end of the 50 mm travel the load was removed, the bearing surface returned to the start position and the procedure repeated. Three results were obtained for each sample, the load for the Coefficient of Friction calculation was taken as the mean value from the straighter end portion of the graph, generally the 20 mm to 50 mm portion.

TABLE 2

| | Sample | | |
|---|---|---|---|
| | Dry | Wet (water) | Oil |
| Example | 0.9 | 0.67 | 0.26 |
| Nitrile rubber nitrile crinkle glove | 1.54 | 0.84 | 0.13 |
| Nitrile rubber untreated (smooth) glove | 1.99 | 1.84 | 0.06 |

The results in Table 2 show that the gloves according to the invention have good dry and wet (water) function and much better function in oil compared to known smooth nitrile rubber or crinkle nitrile rubber gloves. In fact, the lower values in dry and wet (water) conditions than conventional gloves offer more comfort for the wearer because the "stickiness"—feel is reduced.

The invention claimed is:

1. A process for forming, on a liner, a polymeric coating having a surface containing ridges and pits, which process comprises the steps:
   a) providing a liner;
   b) applying to at least a portion of the liner a liquid comprising water and a precursor of a polymeric material to form a coating on the liner;
   c) applying to the surface of the coating on the liner particles of a water-absorbing material selected from the group consisting of a cellulose derivative and a smectite clay;
   d) allowing the particles of the water-absorbing material to absorb water from the coating on the liner thus causing shrinkage of the surface to form a wave-like pattern comprising ridges in the coating and coagulation of the precursor of the polymeric material around the particles to gel the ridges in the surface of the coating;

e) curing the precursor of the polymeric material to form a cured polymeric coating having ridges on the surface of the liner; and f) leaching the cured polymeric coating with water to remove the particles of the water-absorbing material from the surface of the coating to leave pits in the surface of the cured polymeric coating.

2. The process as claimed in claim 1, wherein the polymeric coating comprises an elastomer.

3. The process as claimed in claim 1, wherein contacting the liquid with the water-sorbing material is by sprinkling the particles on the liquid, spraying the particles, shower coating with the particles or fluidised bed application.

4. The process as claimed in claim 2, wherein the elastomer is a rubber.

5. The process as claimed in claim 4, wherein the rubber is nitrile rubber.

6. The process as claimed in claim 1, wherein the cellulose derivative comprises hydroxy ethyl cellulose.

7. A fabric comprising a liner having a polymeric coating on at least a portion thereof, which is formed by the process as claimed in claim 1, wherein the polymeric coating comprises 0.25 to 8 ridges per cm and pits on the surface thereof at an area density of 20 to 2500 $cm^{-2}$.

8. The fabric as claimed in claim 7, wherein the polymeric coating comprises an elastomeric coating.

9. The fabric as claimed in claim 8, wherein the elastomeric coating is a rubber coating.

10. The fabric as claimed in claim 7, wherein the coating comprises 50 to 2000 pits $cm^{-2}$.

11. The fabric as claimed in claim 7, wherein the coating comprises 100 to 2000 pits $cm^{-2}$.

12. The fabric as claimed in claim 7, wherein the polymeric coating comprises 1 to 5 ridges per cm.

13. The fabric as claimed in claim 7, wherein the orientation of the ridges is substantially random.

14. The fabric as claimed in claim 7, wherein the ridges are of varying height.

15. The fabric as claimed in claim 7, wherein at least a portion of the ridges are of 4 mm height or less.

16. The process as claimed in claim 1, wherein the polymeric coating comprises 0.25 to 8 ridges per cm and pits on the surface thereof at an area density of 20 to 2500 $cm^{-2}$.

17. A glove comprising a fabric as claimed in claim 7.

* * * * *